(12) United States Patent
Royyuru

(10) Patent No.: US 8,255,318 B2
(45) Date of Patent: Aug. 28, 2012

(54) APPLICANT AUTHENTICATION

(75) Inventor: Vijay K. Royyuru, Norristown, PA (US)

(73) Assignee: First Data Corporation, Greenwood Village, CO (US)

(*) Notice: Subject to any disclaimer, the term of this patent is extended or adjusted under 35 U.S.C. 154(b) by 523 days.

(21) Appl. No.: 11/874,584

(22) Filed: Oct. 18, 2007

(65) Prior Publication Data

US 2009/0106134 A1    Apr. 23, 2009

(51) Int. Cl.
*G06Q 40/00* (2006.01)
(52) U.S. Cl. .......................................... 705/38; 705/35
(58) Field of Classification Search .................. 705/38, 705/35
See application file for complete search history.

(56) References Cited

U.S. PATENT DOCUMENTS

| | | | |
|---|---|---|---|
| 3,935,361 A | 1/1976 | Dorfman et al. | |
| 4,528,442 A * | 7/1985 | Endo | 235/379 |
| 5,297,026 A | 3/1994 | Hoffman | |
| 5,649,118 A | 7/1997 | Carlisle et al. | |
| 5,744,787 A | 4/1998 | Teicher | |
| 5,764,789 A | 6/1998 | Pare et al. | |
| 5,774,525 A * | 6/1998 | Kanevsky et al. | 379/88.02 |
| 5,787,404 A | 7/1998 | Fernandez-Holmann | |
| 5,805,719 A | 9/1998 | Pare et al. | |
| 5,839,117 A | 11/1998 | Cameron et al. | |
| 5,864,830 A | 1/1999 | Armetta et al. | |
| 5,930,764 A | 7/1999 | Melchione et al. | |
| 5,991,736 A | 11/1999 | Ferguson et al. | |
| 6,070,153 A | 5/2000 | Simpson | |
| 6,076,075 A | 6/2000 | Teicher | |
| 6,138,239 A | 10/2000 | Veil | |
| 6,163,604 A | 12/2000 | Baulier et al. | |
| 6,185,545 B1 | 2/2001 | Resnick et al. | |
| 6,263,447 B1 * | 7/2001 | French et al. | 726/5 |
| 6,289,324 B1 | 9/2001 | Kawan | |

(Continued)

FOREIGN PATENT DOCUMENTS

WO    WO 00/65500    11/2000

OTHER PUBLICATIONS

Wikipedia, "ISO 8583 Standard for Financial Transaction Card Originated Messages—Interchange Message Specifications," found online at http://en.wikipedia.org/wiki/ISO_8583 dated Nov. 27, 2007, 10 pages.

(Continued)

*Primary Examiner* — Thomas Dixon
*Assistant Examiner* — Benjamin S Fields
(74) *Attorney, Agent, or Firm* — Kilpatrick Townsend & Stockton LLP

(57) ABSTRACT

A method of authenticating an applicant. A history is obtained of transactions performed on an account held by the applicant and for which the applicant has been previously authenticated. The transaction history includes information about each transaction. The applicant is asked one or more questions relating to the information in the history. Answers to the one or more questions are received from the applicant, and a decision is made based on the received answers and the transaction history whether the applicant is authenticated. The applicant may be applying for enrollment in a service, and enrollment may be accepted or declined based on whether the applicant is authenticated. The account may relate to a payment instrument, and the authentication may be performed by an entity other than the issuer of the payment instrument.

22 Claims, 8 Drawing Sheets

---

Enrollee Authentication

In order to enroll you and this account in the Mobile Balance Query service we need to verify your identity. We do this by asking you for information that only you as the rightful account holder should know about the transaction history of this card.

What was the amount of your ATM Deposit on August 20th? [ 415.39 ]    ⟵ 401

[ Continue with Enrollment ]

400 ⟶    402 ⟶

U.S. PATENT DOCUMENTS

| | | | |
|---|---|---|---|
| 6,298,336 B1 | 10/2001 | Davis et al. | |
| 6,330,978 B1 | 12/2001 | Molano et al. | |
| 6,430,305 B1 * | 8/2002 | Decker | 382/116 |
| 6,580,440 B1 | 6/2003 | Wagner et al. | |
| 6,598,024 B1 | 7/2003 | Walker et al. | |
| 6,631,849 B2 | 10/2003 | Blossom | |
| 6,678,664 B1 | 1/2004 | Ganesan | |
| 6,685,088 B1 | 2/2004 | Royer et al. | |
| 6,910,020 B2 * | 6/2005 | Oyama et al. | 705/38 |
| 6,941,279 B1 | 9/2005 | Sullivan | |
| 7,050,996 B1 | 5/2006 | Holm-Blagg | |
| 7,058,817 B1 * | 6/2006 | Ellmore | 713/183 |
| 7,379,916 B1 * | 5/2008 | Mizrah | 705/44 |
| 7,430,537 B2 | 9/2008 | Templeton et al. | |
| 2003/0009382 A1 | 1/2003 | D'Arbeloff et al. | |
| 2003/0061093 A1 | 3/2003 | Todd | |
| 2003/0140004 A1 | 7/2003 | O'Leary et al. | |
| 2003/0154406 A1 | 8/2003 | Honarvar et al. | |
| 2003/0204457 A1 | 10/2003 | Arias | |
| 2004/0260607 A1 | 1/2004 | Newton et al. | |
| 2004/0138989 A1 | 7/2004 | O'Malley | |
| 2005/0080692 A1 | 4/2005 | Padam et al. | |
| 2005/0246278 A1 | 11/2005 | Gerber et al. | |
| 2007/0192618 A1 | 8/2007 | Ellmore | |
| 2008/0059364 A1 * | 3/2008 | Tidwell et al. | 705/38 |

OTHER PUBLICATIONS

PCT International Search Report and Written Opinion mailed Apr. 17, 2009; International Application No. PCT/US09/30208, 13 pages.

* cited by examiner

Transaction history for account 1234 5678 9012 3456

| Date | Time | Type | Amount | Merchant | Location | | Class |
|---|---|---|---|---|---|---|---|
| 15AUG2007 | 19:02 | POS PURCH | 129.37 | GROCERY CLUB | 888 88TH ST | DENVER CO 80202 | 5411 |
| 16AUG2007 | 18:35 | ATM WITH | 200.00 | BIG BANK | 444 16TH ST | DENVER CO 80202 | 6021 |
| 17AUG2007 | 07:48 | POS PURCH | 27.88 | FRED'S FUEL | 123 99TH ST | DENVER CO 80202 | 5541 |
| 18AUG2007 | 18:22 | POS PURCH | 39.42 | SAM'S SERVICE | 777 77TH ST | GRAND JCT CO 81501 | 5541 |
| 20AUG2007 | 10:15 | ATM DEPOS | 415.39 | BIG BANK | 444 16TH ST | DENVER CO 80202 | 6021 |
| 22AUG2007 | 10:25 | POS PURCH | 18.92 | FRED'S FUEL | 123 99TH ST | DENVER CO 80202 | 5541 |
| 23AUG2007 | 18:22 | POS PURCH | 144.56 | GROCERY CLUB | 888 88TH ST | DENVER CO 80202 | 5411 |
| 25AUG2007 | 13:39 | POS PURCH | 245.85 | ELECTRONIX MART | 666 66TH ST | DENVER CO 80202 | 5731 |
| 30AUG2007 | 08:32 | POS PURCH | 35.79 | GUS'S GAS | 555 55TH ST | DENVER CO 80202 | 5541 |
| 01SEP2007 | 17:44 | POS PURCH | 52.87 | GROCERY CLUB | 888 88TH ST | DENVER CO 80202 | 5411 |
| 02SEP2007 | 21:55 | ATM WITH | 100.00 | BIG BANK | 444 16TH ST | DENVER CO 80202 | 6021 |
| 05SEP2007 | 10:10 | POS PURCH | 32.81 | FRED'S FUEL | 123 99TH ST | DENVER CO 80202 | 5541 |
| 08SEP2007 | 14:19 | ATM WITH | 120.00 | BIG BANK | 444 16TH ST | DENVER CO 80202 | 6021 |
| 10SEP2007 | 19:43 | POS PURCH | 112.27 | GROCERY CLUB | 888 88TH ST | DENVER CO 80202 | 5411 |
| 14SEP2007 | 20:05 | POS PURCH | 29.54 | FRED'S FUEL | 123 99TH ST | DENVER CO 80202 | 5541 |
| 15SEP2007 | 14:28 | ATM WITH | 120.00 | BIG BANK | 444 16TH ST | DENVER CO 80202 | 6021 |
| 16SEP2007 | 16:32 | POS PURCH | 31.09 | GROCERY CLUB | 888 88TH ST | DENVER CO 80202 | 5411 |
| 22SEP2007 | 09:33 | POS PURCH | 38.22 | FRED'S FUEL | 123 99TH ST | DENVER CO 80202 | 5541 |
| 22SEP2007 | 14:15 | ATM WITH | 120.00 | BIG BANK | 444 16TH ST | DENVER CO 80202 | 6021 |
| 27SEP2007 | 02:31 | POS PURCH | 9.84 | FOOD SHOP | HIGHWAY 8 | TWIZEL, NEW ZEALAND | |

FIG. 2

Mobile Balance Query Service Enrollment

Please complete this form to enroll in the Mobile Balance Query service.

Name(s) | John Smith
Address | 123 Main St.
 | Denver, CO 80202
Email | jsmith@thisemail.net
Telephone | (303) 555-5555

Billing address, if different from above

Card number for which you are enrolling:
1234 5678 9012 3456

[Continue with Enrollment]

FIG. 3

Enrollee Authentication

In order to enroll you and this account in the Mobile Balance Query service we need to verify your identity. We do this by asking you for information that only you as the rightful account holder should know about the transaction history of this card.

What was the amount of your ATM Deposit on August 20th? | 415.39

[Continue with Enrollment]

FIG. 4

Enrollee Authentication

In order to enroll you and this account in the Mobile Balance Query service we need to verify your identity. We do this by asking you for information that only you as the rightful account holder should know about the transaction history of this card.

Which of the cities below did you recently visit and make a purchase in? Please choose one:

- [ ] Pueblo, Colorado
- [ ] Cheyenne, Wyoming
- [ ] Limon, Colorado
- [x] Grand Junction, Colorado

[Continue with Enrollment]

Enrollee Authentication

In order to enroll you and this account in the Mobile Balance Query service we need to verify your identity. We do this by asking you for information that only you as the rightful account holder should know about the transaction history of this card.

Have you ever made a purchase at Electronix Mart? Please choose one:

801

- [x] Yes
- [ ] No

[Continue with Enrollment]

Enrollee Authentication

In order to enroll you and this account in the Mobile Balance Query service we need to verify your identity. We do this by asking you for information that only you as the rightful account holder should know about the transaction history of this card.

At which time of day are you more likely to shop for groceries? Please choose one:

☐ 9:00 AM    ☐ 1:00PM    ☒ 6:00 PM

[ Continue with Enrollment ]

Enrollee Authentication

In order to enroll you and this account in the Mobile Balance Query service we need to verify your identity. We do this by asking you for information that only you as the rightful account holder should know about the transaction history of this card.

Which is a more common ATM withdrawal amount for you? Please choose one:

☐ $40    ☐ $100    ☒ $120    ☐ $140

[ Continue with Enrollment ]

Enrollee Authentication

In order to enroll you and this account in the Mobile Balance Query service we need to verify your identity. We do this by asking you for information that only you as the rightful account holder should know about the transaction history of this card.

Please indicate which one of these foreign cities you recently visited and made a purchase in:

- [ ] Ellora, India
- [x] Twizel, New Zealand
- [ ] Bibury, United Kingdom
- [ ] Kukup, Malaysia

[Continue with Enrollment]

Enrollee Authentication

In order to enroll you and this account in the Mobile Balance Query service we need to verify your identity. We do this by asking you for information that only you as the rightful account holder should know about the transaction history of this card.

About how many ATM withdrawals do you make in a typical month?

- [x] 0
- [ ] 5
- [ ] 10
- [ ] 20

[Continue with Enrollment]

APPLICANT AUTHENTICATION

BACKGROUND OF THE INVENTION

FIG. 1 illustrates a retail payment system for conducting purchase transactions and effecting payment for them using credit cards, debit cards, or other kinds of payment instruments. In the diagram of FIG. 1, a number of consumers 101-104 make purchases at a number of merchants 105-107. Each consumer makes payment using a payment instrument issued by one of issuers 108-110.

Each consumer has a pre-existing relationship with the issuer of the payment instrument being used. The issuer is typically a bank. The bank may extend credit to the consumer, against which the consumer makes purchases with a credit card. In this case, the consumer periodically pays the bank for the purchases, often with funds drawn on a different bank (not shown). Or the bank may hold funds in a debit account and the consumer may make purchases using funds in the account using a debit card.

In a typical credit card transaction, the consumer presents the card to the merchant at a point of sale. The merchant reads account information from the card, often by "swiping" the card through a point of sale (POS) terminal. The POS terminal transmits the account information along with details about the transaction through one of payments networks 111 or 112 to the issuer of the card (or a processing company hired by the issuer) for transaction approval. The transaction details include at least the amount of the proposed transaction, and may include other information to be described later. Usually, the issuer verifies that the consumer has sufficient credit to make the purchase, and transmits the approval back through the payments network to the merchant. For most credit card transactions, the consumer is asked to sign a document at the time of purchase, as a way of authenticating the consumer as the rightful account holder and not someone attempting to make a fraudulent purchase.

A typical debit card transaction proceeds a way similar to a credit card transaction. Often for debit cards, authentication of the consumer is done by way of a personal identification number (PIN) entered by the consumer, rather than using a signature.

More detail about payments networks and payment transactions may be found in pending U.S. patent application Ser. No. 11/055,028 of Rogers et al. and entitled "Methods and systems of processing transactions", the entire disclosure of which is incorporated by reference herein.

Consumer authentication as so far described is based on secret information shared between the issuer and the consumer. For example, in one authentication scheme, when a new credit card is issued, the consumer provides some confidential information, such as the consumer's address, phone number, social security number or other government identification number, or other information. The new card is mailed to the consumer's home, and the consumer is required to call the issuer from the consumer's home phone number to "activate" the card. The consumer also signs the card. These steps help ensure that the signature on the back of a credit card is that of the rightful account holder, as the rightful account holder is the only person likely to be able to receive the card at the consumer's home address and use the consumer's home phone to activate the card. The consumer's signature can then be compared at a point of sale with the signature on the card as a way of verifying that the consumer is also the rightful holder of the card account.

Similarly, a PIN is typically set up for a debit card at the time the debit card is issued, using similar security measures.

Payments networks such as networks 111 and 112 route the communications between merchants and issuers based on information read from the payment instruments. A payments network is an infrastructure that supports the exchange of data in implementing payment transactions. The diagram of FIG. 1 is greatly simplified. In actuality there are roughly dozens of payment networks, hundreds of issuers, thousands of merchants, and millions of consumers. Without these payments networks, each merchant would need a relationship with each issuer whose instruments the merchant wished to accept, and the task of managing transaction approvals would be very burdensome for the merchants. Using payments networks, each merchant need only have a relationship with one or at most a few payments networks. Not all issuers use all networks, and not all merchants accept cards serviced by all networks. Well-known payments networks in operation today include Visa®, MasterCard®, and others used mainly in credit card transactions, and NYCE®, Star®, and others used mainly in debit transactions.

As it has been described so far, a payments network is simply a "pipe" that transfers information back and forth between a merchant and an issuer. The payments network does not have any secret information about the consumer, and takes no part in authenticating the consumer or approving a transaction. The information transmitted by the payments network includes only information about the proposed transaction; it is up to the merchant and the issuer to ensure that the consumer is the rightful account holder.

With the advent of electronic commerce, other complications arise. For example, when a consumer purchases by phone or online, the merchant has no way to verify a signature on a credit card because the consumer is not present in person at the merchant location. Such transactions carry more risk for the merchant than in-person transactions. Some merchants may decline to make certain sales rather than accept the risk. The merchant may miss out on many legitimate sales, and consumers are inconvenienced because they are denied the opportunity to purchases items in the way they wish to.

One solution to the problem of authentication of purchasers in an Internet transaction is for the payments network to offer a verification service for cards or other payment instruments. In this arrangement, the rightful user of a particular card chooses a password that must be supplied whenever the card is used in a transaction where the card is not physically present. The password is known to the payments network or to an issuer processor audited and approved by the payments network, which then requires the password to be given when a transaction is attempted. When the correct password is given during a transaction, all parties have increased confidence that the purchaser is the rightful cardholder, assuming that the rightful person chose the password to start with. In light of this confidence, the payments network shifts the risk of any fraudulent transactions from the merchant to the issuer. Merchants are free to accept verified cards by phone or Internet without worry, and consumers and issuers are confident that if a card is lost of stolen, the card will not be used to make fraudulent purchases because the finder or thief will not know the password.

The success of a card verification service relies on the fact that the rightful cardholder is the one who chose the password. During a consumer's initial enrollment in the card verification service, it is therefore necessary to authenticate the cardholder applying for enrollment. Previously, this was done in cooperation with the issuer of the card. That is, the payments network administrator requested some secret information from the issuer about a particular cardholder, and then required that a cardholder attempting to register a particular card in the service supply the same secret information before enrollment could be completed. The secret information may include the cardholder's home telephone number, part of the consumer's social security number, or other similar information. This level of cooperation requires significant interaction between the issuer and the payments network. Furthermore, this method of authentication undesirably spreads the consumer's secret information to the payments network or other processors, who previously had no need of it.

Electronic commerce also presents new opportunities. For example, systems are being developed for mobile commerce. In a mobile commerce system, a consumer may carry a "digital wallet", which stores credit card information and various other purchasing credentials on a portable electronic device such as a cellular telephone. If a particular card issuer has implemented systems compatible with mobile commerce, consumers may be able make purchases, query their account balances or available credit, make payments, and perform other financial tasks conveniently with one mobile device. A payments network may wish to provide services that enable mobile commerce, even though some card issuers may not implement systems compatible with mobile commerce. For example, a payments network may accept a mobile commerce account balance query from a consumer, send a query through traditional channels to the card issuer, receive the requested information from the card issuer through traditional channels, and then pass the information to the consumer via mobile commerce.

More detail about various systems and methods for conducting mobile commerce may be found in co-pending U.S. patent application Ser. No. 11/830,459 of Arthur et al. and entitled "Payments using a mobile commerce device", the entire disclosure of which is incorporated by reference herein.

Of course, before enrolling a particular consumer in such a service relating to a particular account, the payments network will need to authenticate the applicant for enrollment as the rightful account holder. As is described above, authenticating an applicant by a payments network has traditionally required the cooperation of the issuers. Because there are many card issuers, the task of setting up the new service may be formidable.

BRIEF SUMMARY OF THE INVENTION

In accordance with one example embodiment of the invention a method of authenticating an applicant comprises obtaining a transaction history of transactions performed on an account held by the applicant and for which the applicant has been previously authenticated. The transaction history comprises information about each transaction in the history. The applicant is asked one or more questions relating to the information about one or more transactions in the history, and answers to the questions are received from the applicant. A indication is made, based at least in part on the one or more answers received and the transaction history, whether the applicant is authenticated.

In some embodiments, a first predetermined number of questions is asked, and an applicant's identity is accepted as authenticated upon receipt from the applicant of a second predetermined number of correct answers to the questions.

In some embodiments, one or more patterns or anomalies are identified in the transaction history, and at least one of the questions is framed so as to test the applicant's knowledge of the one or more patterns or anomalies. In some embodiments, at least one pattern or anomaly relates to locations, types, or names of merchants at which some transactions in the transaction history were made. In some embodiments, the merchant types are indicated by Standard Industrial Classification codes. In some embodiments, at least one pattern or anomaly relates to dates or times at which transactions took place, or to amounts involved in transactions. In some embodiments, at least one pattern or anomaly relates to deposit transactions or to withdrawal transactions. In some embodiments, a tested pattern or anomaly is selected so as to be memorable to the applicant without requiring the applicant to remember details of specific transactions in the transaction history. In some embodiments, a tested pattern or anomaly relates to the absence or dearth of a particular kind of data in the transaction history. In some embodiments, a tested pattern relates to at least two items of transaction history information in combination.

In some embodiments, transaction histories of a number of other accounts used by persons other than the applicant are analyzed. At least one pattern or anomaly is identified in the applicant's account that is unusual in relation to the transaction histories of the accounts used by others. At least one question is framed so as to test the applicant's knowledge of the unusual pattern or anomaly.

In some embodiments, the applicant is accepted for or declined for enrollment in a service based at least in part on whether the applicant is authenticated. In some embodiments, the service enables an enrollee to verify an account balance, or is a payment instrument verification service. In some embodiments, the account relates to a payment instrument, and the verification is performed by an entity other than the issuer of the payment instrument. In some embodiments, the authentication is performed by an administrator of a payments network.

In another example embodiment, a system for authenticating an applicant comprises a host computer and a computer readable medium holding instructions executable by the host computer to obtain a transaction history of transactions performed on an account held by the applicant and for which the applicant has been previously authenticated, the transaction history comprising information about each transaction. The applicant is asked one or more questions relating to the information about one or more transactions in the history, and answers to the questions are received from the applicant. The system decides, based at least in part on the one or more answers received and the transaction history, whether the applicant is authenticated. In some embodiments, the instructions are further executable by the host computer to ask the one or more questions in one or more web pages served over the Internet.

In another example embodiment, a method of being authenticated as the rightful holder of a payment instrument account comprises building a transaction history by performing one or more transactions using the payment instrument, information about the transactions being recorded. A first predetermined number of questions is received from an authenticating system that has access to the transaction history. The questions relate to one or more patterns or anomalies in the transaction history. The questions are answered, and upon answering a second predetermined number of the questions correctly, notice is received that authentication was successful.

In another example embodiment, a computer system comprises a display screen and an input device. The computer system is in communication over an electronic network with a host computer system. The computer system displays on the display screen user interface windows served by the host computer system, the user interface windows presenting to a user of the computer system question relating to a transaction history of a payment instrument. The user provides answers to the questions using the input device, and the computer system displays an indication of whether the user is authenticated as the rightful holder of the payment instrument.

In another example embodiment, a method of administering a payments network comprises transmitting information about transactions from points of sale to issuers of payment instruments used in the transactions. The information is stored in transaction histories of the respective payment instruments. An applicant is asked one or more questions relating to the transaction history of a particular payment instrument, and answers to the questions are received from the applicant. Based at least in part on the answers and on the transaction history, the applicant is authenticated as the rightful holder of the particular payment instrument, or the authentication of the applicant is declined. In some embodiments, one or more patterns or anomalies are identified in the transaction history of the particular payment instrument, and at least one of the questions is framed to test the applicant's knowledge of the patterns or anomalies.

BRIEF DESCRIPTION OF THE DRAWINGS

FIG. 2 shows an example partial transaction history for an example account.

FIG. 3 shows a user interface window, in accordance with an example embodiment of the invention.

FIG. 4 shows a user interface window that presents a challenge question relating to the transaction history of FIG. 2, in accordance with an example embodiment of the invention.

FIG. 7 shows a user interface window asking a multiple choice question relating to an anomaly in the transaction history of FIG. 2, in accordance with an example embodiment of the invention.

FIG. 8 shows a user interface window asking a yes/no question relating to the transaction history of FIG. 2, in accordance with an example embodiment of the invention.

FIG. 9 shows a user interface window asking a multiple choice question relating to a pattern in the transaction history of FIG. 2, in accordance with an example embodiment of the invention.

FIG. 10 shows a user interface window asking a multiple choice question relating to a pattern in the transaction history of FIG. 2, in accordance with an example embodiment of the invention.

FIG. 11 shows a user interface window asking a multiple choice question relating to an unusual anomaly in the transaction history of FIG. 2, in accordance with an example embodiment of the invention.

FIG. 12 shows a user interface window asking a multiple-choice question designed to exploit a pattern that reflects a dearth or absence of a particular kind of data in a transaction history.

DETAILED DESCRIPTION OF THE INVENTION

Figure 1:
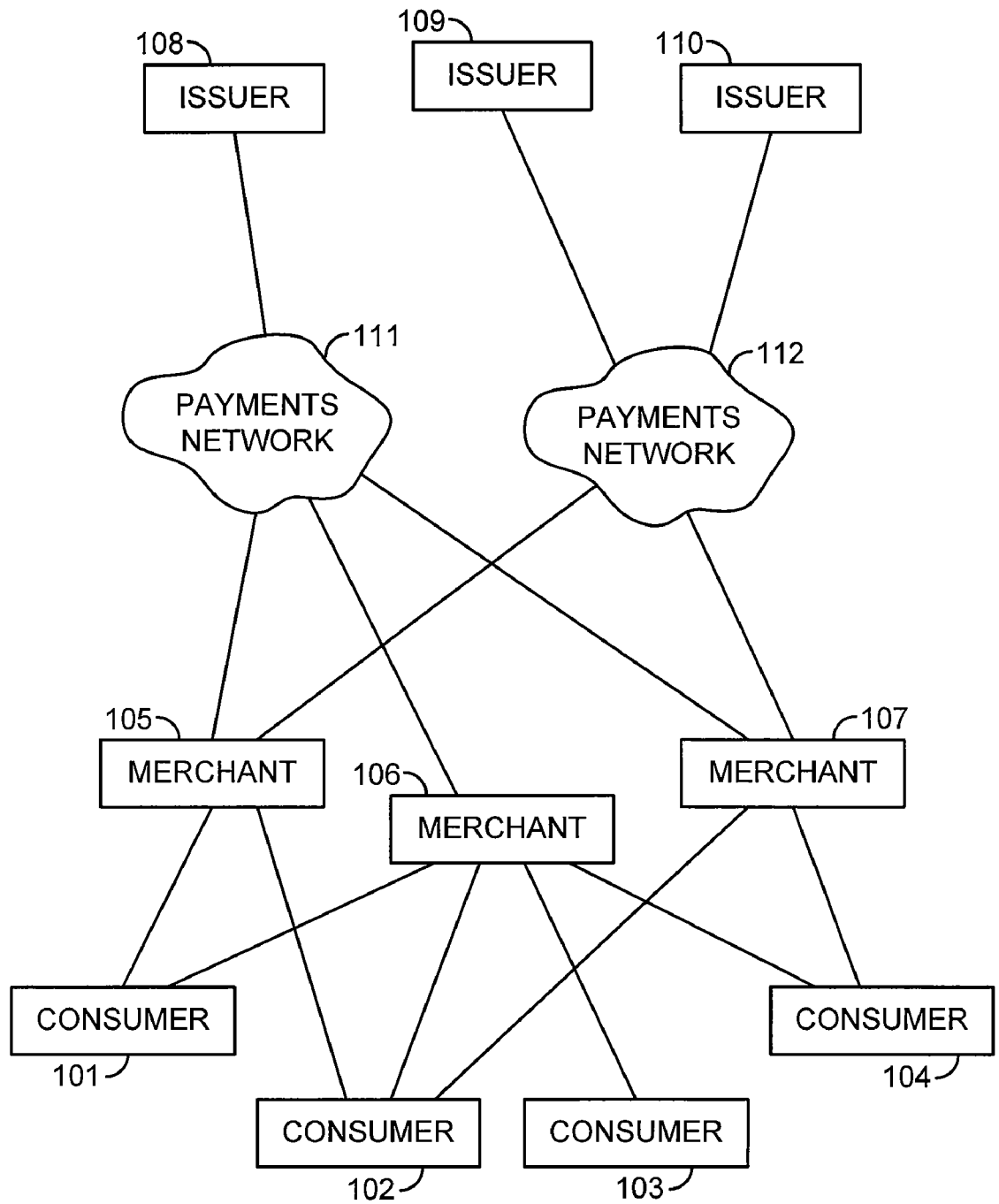
FIG. 1 illustrates a retail payment system for conducting purchase transactions and effecting payment for them using credit cards, debit cards, or other kinds of payment instruments.

The ensuing description describes several example embodiments of the invention, and is not intended to limit the scope, applicability, or configuration of the systems and methods described. Rather, the description will enable those skilled in the art to implement an exemplary embodiment. It will be understood that various changes may be made in the function and arrangement of the elements described without departing from the spirit and scope of the invention as claimed. For example, the order in which method steps are listed in a claim is not intended to limit the claimed invention to performance of the steps in that order. Embodiments of the invention may be implemented by hardware, software, firmware, other technologies, human activity, or any of these in combination.

As was described above, a payments network has typically been thought of as a simple "pipe" carrying transaction information between a merchant and an issuer. Even if the transaction information contains any secret information about the consumer, such as the consumer's name, telephone number, or address, the payment network does not process this data, other than delivering it to the issuer. The payments network "knows" only that a particular transaction relates to a particular account.

Besides the account number, several other items are contained in the information transmitted during approval of a particular transaction. The transaction information may include, for example, the account number, the date and time of the transaction, a transaction type, the transaction amount, the name of the merchant at which a purchase was made, the merchant location, and the merchant classification. Other items may be included as well, for example, whether cash was given in change at the point of sale, whether a surcharge was imposed, or other information. Merchant classifications may use the Standard Industrial Classification (SIC) codes used by the United States government for classifying industries.

Example partial transaction information for a purchase transaction may be as follows:

| | |
|---|---|
| Account Number | 1234 5678 9012 3456 |
| Date of the Transaction | 22-SEP-2007 |
| Time of the Transaction | 09:33 |
| Type of Transaction | POS PURCHASE |
| Transaction Amount | $38.22 |
| Merchant Name | FRED'S FUEL |
| Merchant Location | 123 99TH ST |
| | DENVER |
| | CO |
| | 80202 |
| Merchant Classification | 5541 |

Of course, may other formats are possible, and codes may be used for various fields. For example, the transaction type may simply be recorded as a number that is understood to stand for a POS purchase, automated teller machine (ATM) withdrawal, or other kind of transaction.

Example partial transaction information for an ATM withdrawal may be as follows:

| | |
|---|---|
| Account Number | 1234 5678 9012 3456 |
| Date of the Transaction | 22-SEP-2007 |
| Time of the Transaction | 14:15 |
| Type of Transaction | ATM WITHDRAWAL |
| Transaction Amount | $120.00 |
| Merchant Name | BIG BANK |
| Merchant Location | 444 16TH ST DENVER CO 80202 |
| Merchant Classification | 6021 |

The payments network stores the transaction information for later reference, for example so that any disputes about particular transactions may be easily resolved. The payments network therefore has an extensive history of the transactions performed under each account number, that is using each respective payment instrument.

FIG. 2 shows an example partial transaction history for the example account used above. The transaction history of FIG. 2 is partial in that it shows only transactions occurring during a limited time period, and also because not all items of information collected about each transaction may be shown.

In accordance with one example embodiment of the invention, when a consumer applies for enrollment of a particular account in a service offered by a payments network, the consumer is authenticated by asking the consumer one or more questions about the transaction history of the account. The consumer answers the questions, and the payments network decides whether to accept or decline the applicant for enrollment based at least in part on the answers supplied by the applicant and the transaction history. This kind of authentication scheme is sometimes called "challenge-response authentication", as the applicant is challenged to provide a particular piece of information, which must be given correctly in a response from the applicant in order for authentication to succeed. This is an effective authentication method because all of the transactions in the history were presumably performed by the rightful account holder, whose identity was authenticated at the time the account was set up and verified again during one or more of the transactions in the history. If the applicant is the rightful account holder, he or she is likely to know or have detailed information about the transaction history of the account. Someone who is not the rightful account holder is unlikely to know or have detailed information about the transaction history of the account.

For the purposes of this disclosure, authenticating an applicant means gaining persuasive confidence that the applicant is a person with the right to perform the act applied for, such as enrolling in a service. Deciding whether the applicant is authenticated "based on" the answers means that the answers form at least part of the criteria determining the decision outcome. For example, one particular answer or set of answers may result in the applicant being accepted, while another particular answer or set of answers may result in the applicant being declined. The decision criteria may include other factors in addition to the answers to the challenge questions. For example, the amount of time it takes an applicant to answer the questions could be considered in addition to the answers, and the decision would still be based at least in part on the answers. An "applicant" is any person being authenticated by the methods described and claimed herein, whether the person is applying for enrollment in a service or is being authenticated for some other reason.

Figure 5:
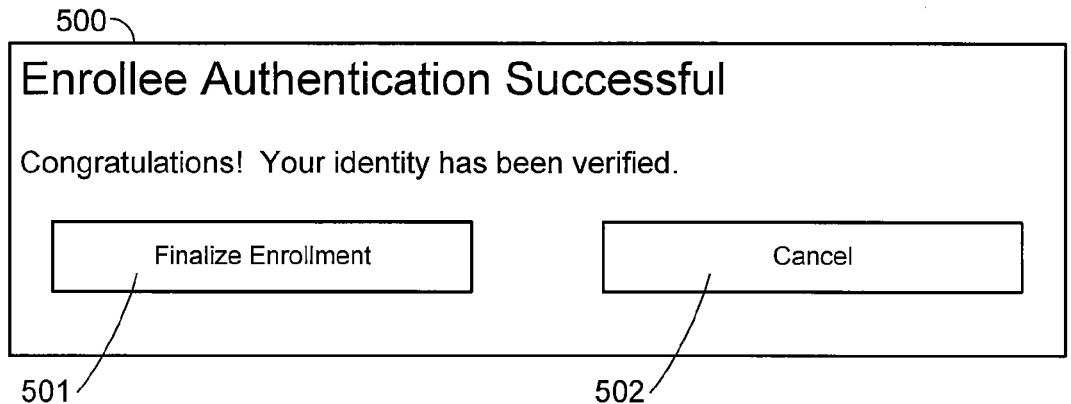
FIG. 5 shows a user interface window that informs an applicant that authentication was successful, in accordance with an example embodiment of the invention.

FIGS. 3-5 show part of an example authentication process implemented in part using Internet web pages served by a host computer executing a program stored in a computer-readable medium. Alternatively, enrollment could be accomplished by telephone, in person at an office or agent of the payments network, in person at a merchant or bank, by mail, at a store operated by a mobile service provider, or by other means. In FIG. 3, user interface window 300 requests the applicant's contact information 301 including a billing address (needed if there will be a charge levied for the service being enrolled in), and requests 302 the number of the account for which the applicant wishes to enroll. The applicant enters the information, and clicks the "Continue with Enrollment" button 303.

In accordance with this embodiment of the invention, the enrollment system obtains the transaction history of the card or other payment instrument account corresponding to the card or account number entered in window 300. User interface window 400 then presents a challenge question. In this example, the applicant is asked for the amount of his or her ATM deposit made on a certain date. This is information that anyone other than the rightful account holder is unlikely to know. The applicant enters the requested information 401, and clicks the "Continue with Enrollment" button 402.

When the applicant enters the correct information, a user interface window such as window 500 shown in FIG. 5 may then appear. Window 500 notifies the applicant that authentication was successful, and gives the applicant the option to finalize 501 his or her enrollment or to cancel 502 enrollment.

In this way, authentication of an applicant for enrollment in the service is accomplished reliably, but without involvement from the issuer of the card or account for which the applicant wishes to enroll. The authentication is reliable because it is very unlikely that anyone other than the rightful cardholder would know, guess, or even be able to determine the detailed transaction history of the card or account.

The example given above used a detail of a specific transaction, namely an ATM deposit, as the challenge question. Other specific details may be used as well. For example, the challenge question may ask the applicant such things as the location of a specific purchase on a specific date, the amount of an ATM withdrawal on a specific date, the date of an ATM withdrawal of a specific amount, or any of a number of other details. For the purposes of this disclosure, a question is any challenge designed to test the applicant's knowledge, whether or not formed as an interrogative sentence, and an answer is the applicant's response to a challenge, whether or not the challenge was formed as an interrogative sentence. For example, the user interface window of FIG. 4 could have stated "Please enter the amount of your ATM deposit on August 20th". Such a challenge would be considered a question, and the applicant's entry would be considered an answer.

Confidence in the authentication may be improved by asking more than one question, and requiring that the applicant answer all of the questions correctly, or requiring that the applicant answer a predetermined number or percentage of the questions correctly before accepting the applicant's identity as authenticated. For example, four questions may be posed, and the applicant may be authenticated if the answers to three or more are correct. This method also helps avoid denying enrollment to a rightful account holder because of a typographical error or the like.

However, an applicant is unlikely to be able to remember information as detailed as the exact amount an ATM deposit on a specific date without referring to an account statement. An account statement may not be readily available, for example if it has already been discarded.

In accordance with another example embodiment of the invention, one or more patterns in the transaction history are identified, and the challenge questions are framed so as to test the applicant's knowledge of the patterns. For the purposes of this disclosure, a pattern is a regular, mainly unvarying way of acting or doing something.

For example, in the transaction history of FIG. 2, there are seven transactions at merchants with a merchant classification code of 5541. Classification 5541 is the classification code for gasoline service stations, and the transaction amounts for these purchases are consistent with the cost of fueling a typical car on the dates indicated. Five of the purchases were at Fred's Fuel on 99th Street in Denver, one purchase was at Gus's Gas on 55th Street in Denver, and one purchase was at Sam's Service in Grand Junction, Colo. A pattern is recognizable in these purchases. It appears that the (presumably rightful) user of this card or account most often buys gasoline at Fred's Fuel. Even though the consumer may not be able to remember the exact dates, times, and amounts of his or her gasoline purchases, it is likely that he or she will know where he or she most often buys gasoline. It is also unlikely that someone who found or stole the card or other payment instrument corresponding to this account would know this pattern. Ideally, a pattern tested by a challenge question is selected so as to be memorable to the rightful account holder without requiring the account holder to remember details of specific transactions, and is unlikely to be known by anyone other than the rightful account holder.

Figure 6:
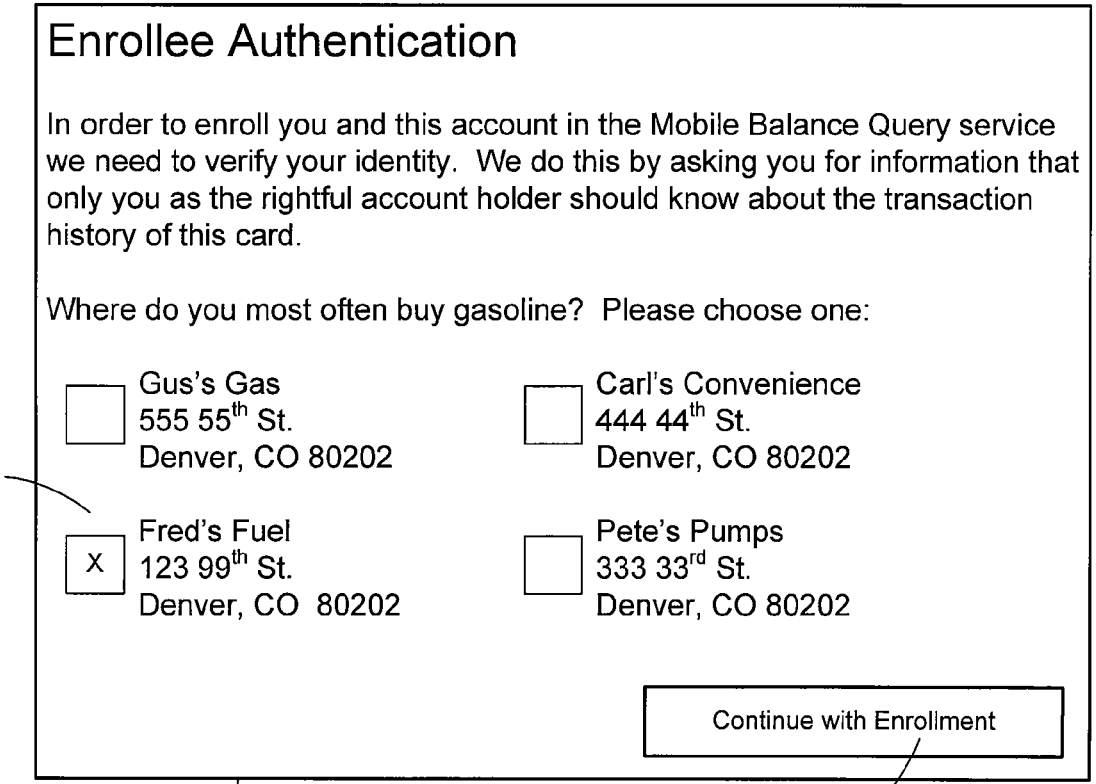
FIG. 6 shows a user interface window asking a multiple choice question relating to a pattern in the transaction history of FIG. 2, in accordance with an example embodiment of the invention.

An example way to exploit this pattern in authentication of the applicant for enrollment is to pose a question relating to the pattern. FIG. 6 shows a user interface window 600 asking a multiple-choice question relating to the pattern of fuel purchases in the transaction history of FIG. 2. In window 600, four choices are presented, one of which is correct. The applicant has indicated 601 the correct choice by selecting the indicator box next to it. The applicant can then click the "Continue with Enrollment" button 602 as previously described. In this example, the transaction history indicates the names and types of merchants where transactions occurred, and the pattern tested relates to both the merchant names and types.

The incorrect answers presented in a multiple choice question such as the one shown in FIG. 6 may be chosen in any appropriate way. For example, in a question relating to merchant names, an incorrect answer may be a merchant name taken from the applicant's transaction history, may be the name of an actual merchant but one that does not appear on the applicant's transaction history, or may be a purely imaginary choice.

In another example embodiment of the invention, one or more anomalies are identified in the transaction history of a particular card or account, and challenge questions are framed so as to test the applicant's knowledge of the anomalies. For example, in the transaction history of FIG. 2, all but two of the purchases were made in Denver. One purchase was made in Grand Junction, Colo. The purchase in Grand Junction is anomalous, as it is a departure from the normal pattern. FIG. 7 shows a user interface window 700 asking a multiple-choice question relating to this anomaly in the transaction history of FIG. 2. In window 700, four choices are presented, one of which is correct. The applicant has indicated 701 the correct choice by selecting the indicator box next to it. The applicant can then click the "Continue with Enrollment" button 702 as previously described. In this example, the transaction history indicates the locations of merchants where transactions occurred, and the anomaly tested relates to the merchant locations.

Of course, more or fewer than four choices may be presented in a multiple choice question. Patterns in a transaction history may be identified using known statistical techniques, for example cluster analysis, or by other techniques. For example, a pattern may be deemed recognized when a particular behavior is recognized to occur three quarters of the time in a transaction history. Many other techniques are possible.

In another example embodiment, at least one of the challenge questions is a yes/no or true/false question. That is, the applicant is asked to choose between two possible answers to a specific question. For example, FIG. 8 shows a user interface window 800 asking a yes/no question relating to the transaction the transaction history of FIG. 2. In window 800, two choices are presented, one of which is correct. The applicant has indicated 801 the correct choice by selecting the indicator box next to it. The applicant can then click the "Continue with Enrollment" button 802 as previously described. Of course, the question could be framed as a true/false question, for example by asking, "True or false, you have made a purchase at Electronix Mart within the past three months?"

When multiple choice, yes/no, or true/false questions are used, rather than questions where a specific value is requested, there is in increased probability that someone other than the rightful account holder may arrive at correct answers by simply guessing. Preferably, the applicant will be required to answer several questions correctly before being recognized as authenticated.

In another example embodiment of the invention, the transaction history indicates times, dates, or both at which some transactions in the history were made, and at least one tested pattern or anomaly relates to the transaction times, dates, or both. For example, in the transaction history of FIG. 2, there are five purchases at Grocery Club, which is identified as a grocery store by its SIC classification of 5411. All of the purchases took place between 16:32 (4:32 in the afternoon) and 19:43 (7:43 in the evening). FIG. 9 shows a user interface window 900 asking a multiple-choice question designed to test the applicant's knowledge of this pattern in the transaction history of FIG. 2. In window 900, three choices are presented, one of which is correct. The applicant has indicated 901 the correct choice by selecting the indicator box next to it. In this example, the pattern tested relates to both the merchant types and the transaction times. Similar patterns may be recognized in transaction dates. For example, if the card or account is used to pay the consumer's electricity bill monthly (likely identifiable by SIC code 4911), and the payment is made at a relatively consistent time of the month, a challenge question could ask, "On what day of the month are you more likely to pay your electricity bill?"

In another example embodiment of the invention, at least one tested pattern or anomaly relates to the transaction amounts in the transaction history. For example, the amounts may be ATM withdrawal amounts. In the transaction history of FIG. 2, five ATM withdrawals are listed, three with amounts of $120, one with an amount of $100, and one with an amount of $200. The consumer holding this account has a pattern of usually, but not always, withdrawing $120 when making an ATM withdrawal. FIG. 10 shows a user interface window 1000 asking a multiple-choice question designed to test the applicant's knowledge of this pattern in the transaction history of FIG. 2. In window 1000, four choices are presented, one of which is correct. The applicant has indicated 1001 the correct choice by selecting the indicator box next to it.

When a challenge question relates to a pattern in the transaction history of a card or other payment instrument, there is some risk that a person other than the cardholder might be able to guess the correct answer to a multiple choice question simply using a knowledge of the habits the general population. For example, a person might discover or observe that the vast majority of ATM withdrawals are for amounts of $40 or $100. (This is a purely hypothetical example, and no inference should be made that this is in fact true.) Such a person may well be able to guess the correct answer to the question (posed to another person), "What is a more common ATM withdrawal amount for you?" by simply choosing $40 or $100 as the answer.

In accordance with another example embodiment of the invention, the risk of compromise by a well-informed guesser is minimized by analyzing transaction histories of a number of other payment instruments used by persons other than the applicant. Patterns or anomalies in the transaction histories of those payment instruments are identified, and patterns or anomalies are identified in the transaction history of the payment instrument presented by the applicant for enrollment. At least one pattern or anomaly is identified in the transaction history of the applicant that is unusual in relation to the transaction histories of the other payment instrument transaction histories. One or more challenge questions are then framed and so as to test the applicant's knowledge of the unusual pattern or anomaly. Using the example above, an analysis of a large number of transaction histories may reveal that the most common ATM withdrawal amount for many consumers is either $40 or $100, although any particular account may have nearly any amount as its most common ATM withdrawal amount. The analysis may further reveal that only a small percentage of accounts have a most common ATM withdrawal amount of $120. In the transaction history of FIG. 2, the most common ATM withdrawal amount was $120, so this particular account is one of a small minority with an unusual pattern. A well-informed guesser, knowing that $120 is an unusual most common ATM withdrawal amount is unlikely to guess this as the answer to the question "Which is a more common ATM withdrawal amount for you?"

The above example tested an applicant's knowledge of an unusual pattern in his or her transaction history. Unusual anomalies are also possible in a transaction history. While an anomaly is something that is a departure from the normal pattern within a particular transaction history, an unusual anomaly is an anomaly that also does not occur often in even a large sampling of transaction histories of a large number of consumers, and is thus unusual in relation to the other card or other payment instrument transaction histories. For example, in the transaction history of FIG. 2, a purchase is listed as being made in a shop in a small foreign town. This is likely an unusual anomaly, because not only does it not fit with the account holder's usual pattern, relatively few other account holders ever make purchases in this small foreign town. (We leave aside in this discussion the possibility that a transaction may be so anomalous as to raise suspicions of error or fraud.) FIG. 11 shows a user interface window 1100 asking a multiple-choice question designed to exploit this unusual anomaly in the transaction history of FIG. 2. In window 1100, four answers are presented, one of which is correct. The applicant has indicated 1101 the correct answer by selecting the indicator box next to it. Anyone who is not the rightful card or account holder would be very unlikely to choose the correct answer using knowledge of the habits of the general population, because the guesser is simply unlikely to know which of the small foreign towns listed is most likely to have been visited. A pattern or anomaly may be considered to be unusual, for example, if it is found in fewer than one percent or fewer than 0.10 percent of transaction histories, although other thresholds may be chosen. The question shown in FIG. 11 is an example of a challenge question not formed as an interrogative sentence.

Another kind of pattern or anomaly that may be tested relates to the dearth or absence of a particular kind of data in the transaction history. This kind of pattern or anomaly may also be an unusual pattern or anomaly. For example, a particular applicant may seldom or never use a particular debit card for ATM withdrawals. The transaction history of that card would therefore have an absence or dearth of ATM withdrawal transactions. This pattern can be tested by presenting a challenge question for which zero is the correct answer. FIG. 12 shows a user interface window 1200 asking a multiple-choice question designed to exploit a pattern that reflects a dearth or absence of a particular kind of data in a transaction history (which is of course not the transaction history shown in FIG. 2). The applicant has indicated 1201 the correct choice by selecting the indicator box next to it.

If an analysis of transaction histories of other accounts used by other people indicated that it is very unusual for a debit card to seldom or never be used to make an ATM withdrawal, then the pattern tested in the example of FIG. 12 would also be considered to be an example of an unusual pattern.

Many other kinds of patterns may be envisioned that relate to a dearth or absence of a particular kind of data, and may relate to any of various data items in a transaction history, including merchant types, times and dates of transactions, transaction amounts, or other items alone or in combination. For example, a particular account history may contain no transactions performed at gasoline service stations, or may only rarely show a transaction that takes place in the morning. Each of these patterns may easily be exploited using a challenge question similar to the one shown in FIG. 12. A transaction history may show a pattern of only small purchases being made at grocery stores, and therefore show a dearth or lack of large transactions made at grocery stores. Such a pattern could be exploited by the challenge question, "About how often do you spend more than $100 in a single visit to the grocery store?", for example. This is an example of a challenge question relating to a dearth or absence of a particular kind of data relating to two transaction history data items in combination, namely merchant type and transaction amount.

Figure 13:
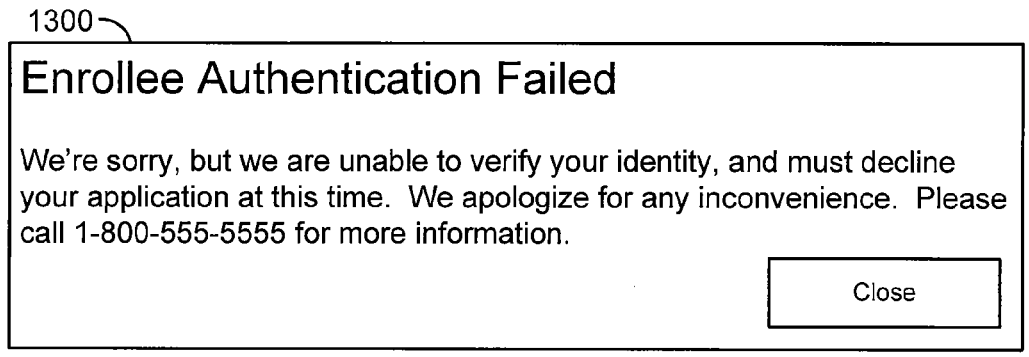
FIG. 13 shows a user interface window that informs an applicant that authentication failed, in accordance with an example embodiment of the invention.

Of course, not all enrollee authentications will be successful. Some applicants will fail to supply enough correct answers to the challenge questions, and those authentications will fail. The payments network or other enrolling entity may wish to decline any applications for which authentication failed. Alternative authentication procedures may be offered. FIG. 13 shows an example user interface window 1300 that may be used to notify an applicant that his or her authentication failed.

Figure 14:
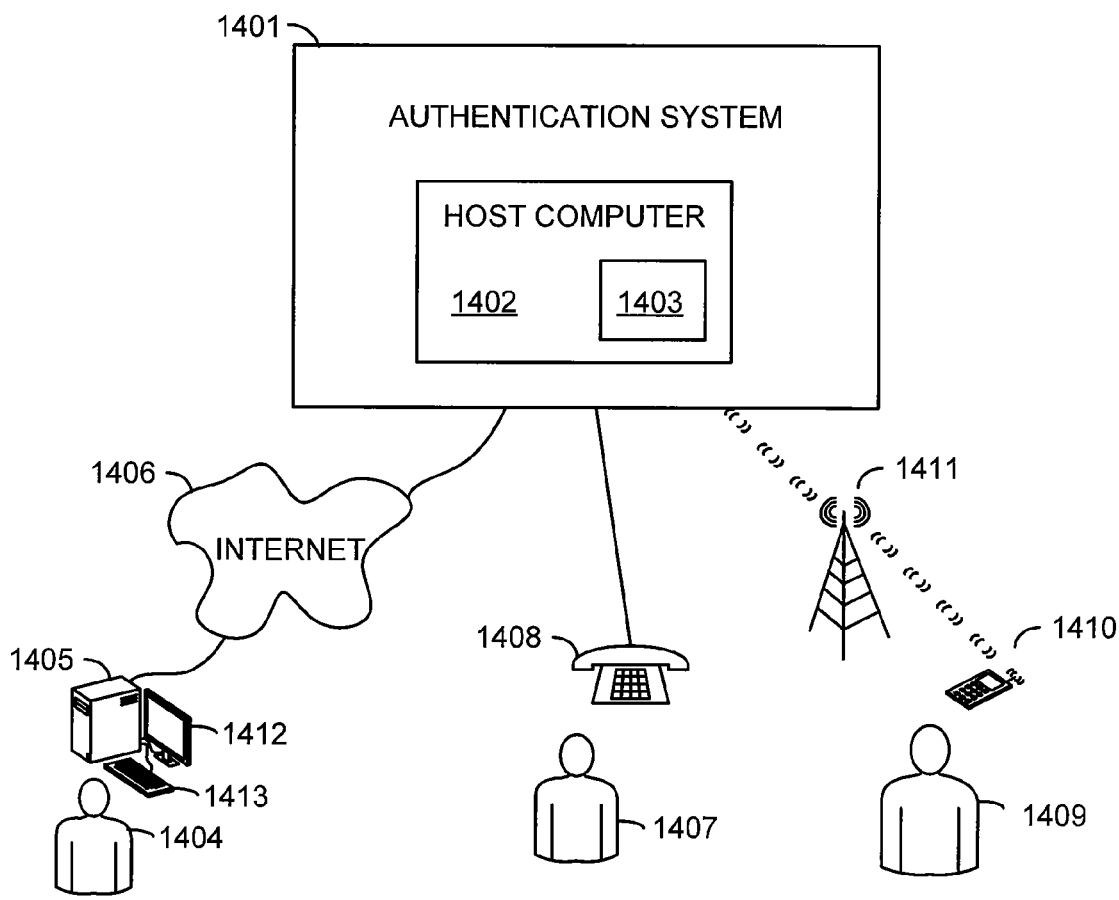
FIG. 14 shows a simplified block diagram of an authentication system for implementing an authentication method in accordance with an example embodiment of the invention.

FIG. 14 shows a simplified block diagram of an authentication system 1401 for implementing an authentication method in accordance with an example embodiment of the invention. Authentication system 1401 may comprise various infrastructure, including host computer system 1402. Host computer system 1402 further comprises computer readable memory 1403. Memory 1403 may comprise volatile memory such as processor registers, random access memory (RAM), cache memory, and the like. Memory 1403 may also comprise nonvolatile memory such as read only memory (ROM), flash memory, programmable read only memory (PROM), erasable programmable read only memory (EPROM), and the like. Memory 1403 may also comprise mass storage, such as one or more magnetic disk drives, magnetic tape, optical storage, and the like. Memory 1403 may comprise any of these and other kinds of memory in a wide variety of combinations. Computer readable memory 1403 may serve as a computer readable medium holding instructions executable by host computer 1402 for administering the authentication system, and holds various data files containing information relating to the operation of the authentication system. Memory 1403 may store transaction histories. While computer system 1402 is shown as a monolithic block, it may comprise multiple computers, which may be co-located or widely dispersed. Similarly, memory 1402 may comprise multiple storage units in one or more locations.

A first applicant 1404 interacts with authentication system 1401 through the Internet 1406, using a personal computer 1405. First applicant 1404 may view various display screens or user interface windows as depicted in FIGS. 3-13 on display screen 1412, and may use an input device, for example keyboard 1413 to provide input to the system. A second applicant 1407 interacts with authentication system 1401 through a land line telephone 1408. A third applicant 1409 interacts with authentication system 1401 through a mobile device 1410, which may be, for example, a cellular telephone that communicates wirelessly over a wireless provider network represented by tower 1411. Of course, the systems in FIG. 14 are greatly simplified for ease of explanation. An applicant interacting with authentication system 1401 by telephone (whether wired or wireless) may enter data using an interactive voice response system, by keying information into a keypad or the like, or by speaking with a customer service representative.

An applicant interacting with authentication system 1401 through the Internet 1406 may preferably enter data into a series of Internet web pages exemplified in FIGS. 3-13.

While several items of transaction information typically present in a transaction history have been discussed in the above example, other items may be stored as well. Other items often stored for each transaction in a transaction history but not discussed above may include, without limitation:

- an "Acquiring Country Code" indicating in what country a transaction occurred;
- a "From Account Qualifier", indicating whether the account being accessed is a checking, savings, credit, or other kind of account;
- an indication of whether an ATM used in the transaction is at a branch location of the financial institution or at an off-branch location; or
- an indication of whether an ATM used in the transaction is owned by the card issuing bank, or is a "foreign" ATM, owned by a different institution.

Challenge questions may be envisioned, within the scope of the appended claims, that relate to any or all of these items, alone or in combination with other items.

Challenge questions may test the applicant's knowledge of specific items, patterns, or anomalies in these or other transaction history data, and may test the applicant's knowledge of patterns involving combinations of items. For example, other challenge questions that could be used include, without limitation, the questions below.

"Which of these five merchants do you frequent most often?" (Relating at least to merchant names and transaction dates.)

"Where is the ATM you use most often?" (Relating at least to transaction type and dates and merchant locations.)

"About how many ATM withdrawals do you make in a typical month?"(Relating at Least to Transaction Types and Dates.)

"About how many ATM deposits do you make in a typical month?"(Relating at Least to Transaction Type and Dates.)

"About how many purchases do you make in a typical week with this card?" (Relating at least to transaction type and dates.)

"What is your typical cash back amount when you receive cash at the grocery store?" (Relating at least to transaction type, merchant type, and cash back amount.)

"About how often do you pay a surcharge fee for an ATM withdrawal?"(Relating at Least to Transaction Type and Fees.)

"When you pay a surcharge fee, how much do you usually pay?" (Relating at least to transaction type and fees.)

"Do you most often withdraw cash from checking or savings?" (Relating at least to transaction type and account qualifier.)

"The ATM you use most often is closest to which or these merchants?" (Relating at least to transaction type, and merchant names and locations.)

"Of these banks, which bank's ATM do you visit most often?" (Relating at least to transaction type and dates, merchant names, and whether ATM is "foreign".)

"Which of these are you more likely to do within one hour of each other? a) Buy gasoline and make an ATM withdrawal, or b) buy groceries and buy a cup of coffee." (Relating at least to merchant types, transaction types, and transaction times.)

"About how many times have you purchased airline tickets directly from an airline in the past year?" (Relating at least to merchant type and transaction dates.)

"Is the ATM you visit most often closer to the grocery store you visit most often or to the gas station you visit most often?" (Relating at least to transaction type, merchant types, and merchant locations.)

Many, many other questions within the scope of the appended claims may be envisioned.

While the examples given in the Figures relate to an applicant for enrollment in a service, the authentication method described and claimed may be used in any situation where a transaction history containing information about transactions performed on an account held by an applicant is available.

The invention has now been described in detail for the purposes of clarity and understanding. However, those skilled in the art will appreciate that certain changes and modifications may be practiced within the scope of the appended claims.

What is claimed is:

1. A method of authenticating an applicant, the method comprising:
    obtaining, by a host computer system, a transaction history of transactions performed on an account held by the applicant and for which the applicant has been previously authenticated, the transaction history comprising information about each transaction;
    identifying, by the host computer system, one or more patterns or anomalies in the transaction history;
    asking, by the host computer system over an electronic network, the applicant one or more questions relating to the information about one or more transactions in the history, the host computer system framing at least one of the one or more questions so as to test the applicant's knowledge of the one or more patterns or anomalies;
    receiving, by the host computer system, from the applicant answers to the one or more questions; and
    indicating, by the host computer system, based at least in part on the one or more answers received and the transaction history, whether the applicant is authenticated.

2. The method of claim 1, wherein asking the applicant one or more questions comprises asking the applicant a first predetermined number of questions, the method further comprising accepting the applicant's identity as authenticated upon receiving from the applicant, in response to the first predetermined number of questions, a second predetermined number of correct answers.

3. The method of claim 1, wherein the information indicates one or more items selected from the group consisting of locations, types, and names of merchants at which at least some transactions in the history were made, and wherein at least one pattern or anomaly relates to the one or more items.

4. The method of claim 3, wherein the information indicates types of merchants at which at least some transactions in the history were made, and wherein the merchant types are indicated by standard industrial classification codes.

5. The method of claim 1, wherein the information indicates times, dates, or both at which at least some transactions in the history were made, and wherein at least one pattern or anomaly relates to the transaction times, dates, or both.

6. The method of claim 1, wherein the information indicates amounts involved in at least some transactions in the history, and wherein at least one pattern or anomaly relates to the transaction amounts.

7. The method of claim 6, wherein the transaction amounts are automated teller machine withdrawal amounts.

8. The method of claim 1, wherein at least some of the transactions in the history are withdrawals, and wherein at least one pattern or anomaly relates to the withdrawal transactions.

9. The method of claim 1, wherein at least some of the transactions in the history are deposits, and wherein at least one pattern or anomaly relates to the deposit transactions.

10. The method of claim 1, further comprising:
analyzing, by the host computer system, transaction histories of a number of other accounts used by persons other than the applicant;
identifying, by the host computer system, in the transaction history of the applicant's account at least one pattern or anomaly that is unusual in relation to the transaction histories of the accounts used by the other persons; and
framing, by the host computer system, at least one of the one or more questions so as to test the applicant's knowledge of the unusual pattern or anomaly.

11. The method of claim 1, wherein at least one of the identified patterns or anomalies is selected so as to be memorable to the applicant without requiring the applicant to remember details of specific transactions in the transaction history.

12. The method of claim 1, wherein at least one of the one or more patterns or anomalies relates to a dearth or absence of a particular kind of data in the transaction history.

13. The method of claim 1, wherein at least one of the one or more patterns or anomalies relates to at least two items of transaction information in combination.

14. The method of claim 1, further comprising accepting or declining the applicant for enrollment in a service based at least in part on whether the applicant is authenticated.

15. The method of claim 14, wherein the service enables an enrollee to verify an account balance.

16. The method of claim 14, wherein the service is a payment instrument verification service.

17. The method of claim 1, wherein the account relates to a payment instrument, and wherein the verification is performed by an entity other than the issuer of the payment instrument.

18. The method of claim 17, wherein the authentication is performed by an administrator of a payments network.

19. A system for authenticating an applicant, comprising:
a host computer; and
a computer readable medium holding instructions executable by the host computer to
obtain a transaction history of transactions performed on an account held by the applicant, the transaction history comprising information about each transaction;
identify one or more patterns or anomalies in the transaction history;
ask the applicant one or more questions relating to the information about one or more transactions in the history, at least one of the questions framed to test the applicant's knowledge of the one or more patterns;
receive from the applicant answers to the one or more questions; and
decide, based at least in part on the one or more answers received and the transaction history, whether the applicant is authenticated.

20. The system of claim 19, the instructions further executable by the host computer to ask the one or more questions in one or more web pages served over the Internet.

21. A computer system, comprising:
a display screen; and
an input device;
the computer system in communication over an electronic network with a host computer system, the computer system displaying on the display screen user interface windows served by the host computer system, the user interface windows presenting to a user of the computer system questions relating to a transaction history of a payment device, the user providing answers to the questions using the input device, and the computer displaying on the display screen an indication of whether the user has been authenticated as the rightful holder of the payment instrument;
wherein the questions test the applicant's knowledge of one or more patterns or anomalies in the transaction history.

22. A method of administering a payments network, comprising:
transmitting, by a host computer system over an electronic network, information about transactions from points of sale to issuers of payment instruments used in the transactions;
storing, by the host computer system, the information in transaction histories of the respective payment instruments;
identifying, by the host computer system, one or more patterns or anomalies in the transaction history of the particular payment instrument,
asking, by the host computer system, an applicant one or more questions relating to the transaction history of a particular payment instrument, the host computer system framing at least one of the one or more questions so as to test the applicant's knowledge of the one or more patterns or anomalies;
receiving, by the host computer system, from the applicant answers to the one or more questions; and
based at least in part on the answers and on the transaction history of the particular payment instrument, authenticating the applicant as the rightful holder of the particular payment instrument or declining to authenticate the applicant as the rightful holder of the particular payment instrument.

* * * * *